United States Patent [19]

Drexler

[11] Patent Number: 4,680,459

[45] Date of Patent: Jul. 14, 1987

[54] UPDATABLE MICROGRAPHIC POCKET DATA CARD

[75] Inventor: Jerome Drexler, Los Altos Hills, Calif.

[73] Assignee: Drexler Technology Corporation, Mountain View, Calif.

[21] Appl. No.: 798,146

[22] Filed: Nov. 14, 1985

Related U.S. Application Data

[63] Continuation-in-part of Ser. No. 721,383, Apr. 9, 1985, abandoned, which is a continuation-in-part of Ser. No. 693,856, Jan. 22, 1985, which is a continuation-in-part of Ser. No. 443,596, Nov. 22, 1982, Pat. No. 4,503,135, which is a continuation-in-part of Ser. No. 238,832, Feb. 27, 1981, Pat. No. 4,360,728, and a continuation-in-part of Ser. No. 238,833, Feb. 27, 1981, abandoned.

[51] Int. Cl.⁴ ............................................. G06C 19/00
[52] U.S. Cl. .................................... 235/487; 235/454; 346/76 L; 350/361; 365/106; 427/7; 428/209; 430/10
[58] Field of Search ........................ 235/468, 487, 494; 283/76, 93, 901, 902; 350/241; 353/27 R; 354/7; 346/76 L; 428/209; 427/7, 145

[56] References Cited

U.S. PATENT DOCUMENTS

| | | | |
|---|---|---|---|
| 3,820,123 | 6/1974 | Ammann | 354/7 |
| 4,145,758 | 3/1979 | Drexler et al. | 430/616 |
| 4,236,332 | 12/1980 | Domo | 40/2.2 |
| 4,254,329 | 3/1981 | Gokey et al. | 235/454 X |
| 4,269,917 | 5/1981 | Drexler et al. | 430/16 |
| 4,278,756 | 7/1981 | Bouldin et al. | 430/414 |
| 4,298,684 | 11/1981 | Bouldin et al. | 430/616 |
| 4,314,260 | 2/1982 | Drexler | 346/76 L |
| 4,343,879 | 8/1982 | Drexler et al. | 430/14 |
| 4,360,728 | 11/1982 | Drexler | 283/93 X |
| 4,596,409 | 6/1986 | Holbein et al. | 283/93 X |

FOREIGN PATENT DOCUMENTS 2036369  6/1980  United Kingdom .
2044175  10/1980  United Kingdom .

*Primary Examiner*—David L. Trafton

[57] ABSTRACT

A strip of optical contrast laser recording material is disposed on a wallet-size card, and has laser written micrographic characters recorded thereon. The characters are formed of a matrix of laser recorded character spots and are eye readable using twenty power magnification. The characters are recorded in situ on the card, after the strip is disposed in the card, by a laser having a beam focused on the strip. A light detector reads the reflected beam to confirm laser writing. Either raster-like or zig-zag scanning of the beam creates each character matrix. Each of the character spots may be made up of one laser spot or by a group of laser spots.

15 Claims, 6 Drawing Figures

UPDATABLE MICROGRAPHIC POCKET DATA CARD

CROSS REFERENCE TO RELATED APPLICATIONS

This is a continuation-in-part of patent application Ser. No. 721,383 filed Apr. 9, 1985, now abandoned, which is a continuation-in-part of patent application Ser. No. 693,856 filed Jan. 22, 1985, which is a continuation-in-part of patent application Ser. No. 443,596 filed Nov. 22, 1982, now U.S. Pat. No. 4,503,135 which is a continuation-in-part of patent application Ser. No. 238,832 filed Feb. 27, 1981, now U.S. Pat. No. 4,360,728, granted Nov. 23, 1982; and patent application Ser. No. 238,833 filed Feb. 27, 1981, now abandoned.

TECHNICAL FIELD

The invention relates to optical data information storage and more particularly to a method for recording laser written updatable micrographic information on a pocket-or wallet-size card.

BACKGROUND ART

In optical data storage cards, reliability and ease of reading the data are important. Data may be recorded in an office environment, but need to be read in a dirty environment or when no card reading machine is available, such as in an emergency. For example, medical-record cards should be readable in an ambulance, at the scene of an accident, or on a battlefield. In such conditions, it may be difficult or impossible to read digitally recorded data on a card or paper copies in a file.

In U.S. Pat. No. 4,254,329 to Gokey et al., an information retrieval system includes a microfiche data base of two types of microfiche cards. One type is machine readable only, while the other has both machine readable and visually readable information. This information cannot be updated.

In U.S. Pat. No. 4,236,332, Domo discloses a medical record card containing a microfilm portion having some data visible to the eye and other data visible by magnification. The directly visible data is alphanumeric character codes pertaining to emergency medical conditions of the patient and the magnifiable data portions detail the medical history. This information cannot be updated.

An object of the invention is to provide a method and system for recording laser written information on a card that can be visually read by a person with the help of magnifying optics.

It is another object of the invention to provide a card in which visually read information can be recorded in place on the card.

It is another object of the invention to provide a method and system for updating information on a wallet-size card that can be read visually by a person.

DISCLOSURE OF THE INVENTION

The above objects have been met with a method and system for recording in situ microscopically visually readable information on a strip of optical contrast laser recording material, disposed on a pocket- or wallet-size card.

A laser beam records microscopically visually readable information on a strip of optical storage material, in situ, either by ablation, melting, physical or chemical change, thereby forming spots representing changes in reflectivity. The recording process produces differences in reflectivity detectable by a light detector. Micrographic characters are sequentially recorded as matrices of spots on the laser recordable material, and are readable with a magnifier. These spots are written by scanning in a zig-zag or raster-like pattern over the matrix and writing laser spots at designated locations so that characters can be formed one by one. Such micrographic characters are formed directly by the spots or by groups of laser spots, called character spots.

Microscopically visually read characters created by the spots may include alphanumerics, dates, script writing, foreign language alphabets and numerics, maps, foreign language picture characters such as Chinese and Japanese characters, mathematical symbols, logic symbols, scientific and musical notations, and other symbols and notations. It could also include emblems, logos, codes, and trademarks.

The uniform surface reflectivity of this reflective strip before recording typically would range between 8% and 65%. For a highly reflective strip the average reflectivity over a laser recorded spot might be in the range of 5% to 25%. Thus, the reflective contrast ratio of the recorded spots would range between 2:1 and 7:1. Laser recording materials are known in the art that create either low reflectivity spots in a moderate to high reflectivity field or high reflectivity spots in a low reflectivity field. An example of the latter type is described in U.S. Pat. No. 4,343,879. When the reflectivity of the field is in the range of 8% to 20% the reflective spots have a reflectivity of about 40%. The reflective contrast ratio would range from 2:1 to 5:1. Photographic pre-formatting would create spots having a 10% reflectivity in a reflective field or 40% in a low reflectivity field. No processing after laser recording is required when the recording strip is a direct-read-after-write material. Laser recording materials also may be used that require heat processing after laser recording.

By means of in situ laser recording, information that needs to be read in an emergency where no card reading machine is available is written in microscopically readable form. The information would include personal and medical information, transactions, office forms, multiple language information, the date of the most recent update of information on the card titles and instructions. Maps, charts, tables, graphs, diagrams, and written music could also be recorded in this form.

BEST MODE FOR CARRYING OUT THE INVENTION

Figure 1:
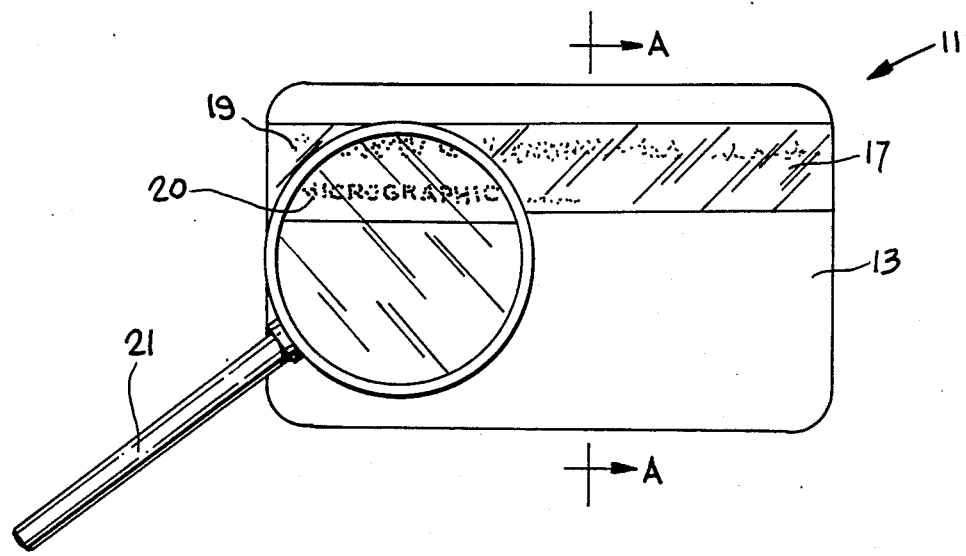
FIG. 1 is a top plan view of a pocket data card having micrographic information in accord with the present invention.

With reference to FIG. 1, a data card 11 is illustrated having a size common to most credit cards. The width dimension of such a card is approximately 54 mm and the length dimension is approximately 85 mm. These dimensions are not critical, but preferred because such a size easily fits into a wallet or pocket and has historically been adopted as a convenient size for automatic teller machines and the like. The card's base 13 is a dielectric, usually a plastic material such as polyvinyl chloride or similar material. Polycarbonate plastic is preferred. The surface finish of the base should have low specular reflectivity, preferably less than 10%.

Base 13 carries strip 17. The strip is typically 16 or 35 millimeters wide and extends the length of the card. Alternatively, the strip may have other sizes and orientations. The strip is relatively thin, approximately 60–200 microns, although this is not critical. Strips of laser recording material may be applied to both sides of card 11. The strip may be applied to the card by any convenient method which achieves flatness.

Figure 3:
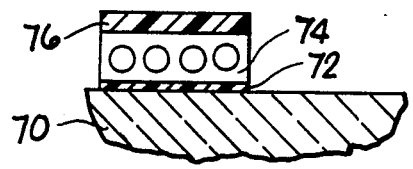
FIG. 3 is a partial sectional view of a micrographic data card formed by an alternate storage medium.

The strip 17 is adhered to the card with an adhesive and is covered by a transparent laminating sheet 76 seen in FIG. 3 which serves to keep strip 17 flat, as well as protecting the strip from dust and scratches. Sheet 76 is a thin, transparent plastic sheet laminating material or a coating, such as a transparent lacquer. The material is preferably made of polycarbonate plastic.

The high resolution laser recording material which forms strip 17 may be any of the reflective recording material which have been developed for use as direct read-after-write (DRAW) optical disks, so long as the materials can be formed on thin substrates. An advantage of reflective materials over transmissive materials is that the write equipment is all on one side of the card and automatic focus is easier, and twice as much data can be stored by using both sides. For example, the high resolution material described in U.S. Pat. No. 4,230,939 issued to de Bont, et al. teaches a thin metallic recording layer of reflective metals such as Bi, Te, Ind, Sn, Cu, Al, Pt, Au, Rh, As, Sb, Ge, Se, Ga. Materials which are preferred are those having high reflectivity and low melting point, particularly Cd, Sn, Tl, Ind, Bi and amalgams. Suspensions of reflective metal particles in organic colloids also form low melting temperature laser recording media. Silver is one such metal. Typical recording media are described in U.S. Pat. Nos. 4,314,260, 4,298,684, 4,278,758, 4,278,758, 4,278,756 and 4,269,917, all assigned to the assignee of the present invention.

The laser recording material which is selected should be compatible with the laser which is used for writing on it. Some materials are more sensitive than others at certain wavelengths. Good sensitivity to infrared light is preferred because infrared is affected least by scratches and dirt on the transparent laminating sheet. The selected recording material should have a favorable signal-to-noise ratio and form high contrast spots with the write system with which it is used.

The material should not lose data when subjected to temperatures of about 180° F. (82° C.) for long periods. The material should also be capable of recording at speeds of at least several thousand laser spots/sec. This generally precludes the use of materials that require long heating times or that rely on slow chemical reactions in the presence of heat, which may permit recording of only a few laser spots/sec. A large number of highly reflective laser recording materials have been used for optical data disk applications.

Strip 17 also has microscopic visually readable information 20. The information is recorded as a matrix of character spots by a laser by scanning in a zig-zag or raster-like pattern over the matrix and writing laser spots at designated locations to form micrographic characters. The information matrices are generally about 200 microns high, so they are read by magnification, such as through optical magnifier 21.

A laser forms spots in the surrounding field of the reflective layer itself, by ablation, melting, physical or chemical change, thereby altering the reflectivity in the spot. The information is read by viewing with magnifying optics the optical reflective contrast between the surrounding reflective field of unrecorded areas and the recorded spots. Spot reflectivity of less than half of the reflectivity of the surrounding field produces a contrast ratio of at least two to one, which is sufficient contrast for reading. Greater contrast is preferred. Reflectivity of the strip field of about 50% is preferred with reflectivity of a spot in the reflective field being less than 10%, thus creating a contrast ratio of greater than five to one. Alternatively, data may also be recorded by increasing the reflectivity of the strip. For example, the recording laser can melt a field of dull microscopic spikes on the strip to create flat shiny spots. This method is described in SPIE, Vol. 329, Optical Disk Technology (1982), p. 202. A spot reflectivity of more than twice the surrounding spiked field reflectivity produces a contrast ratio of at least two to one, which is sufficient contrast for reading.

Figure 2A:
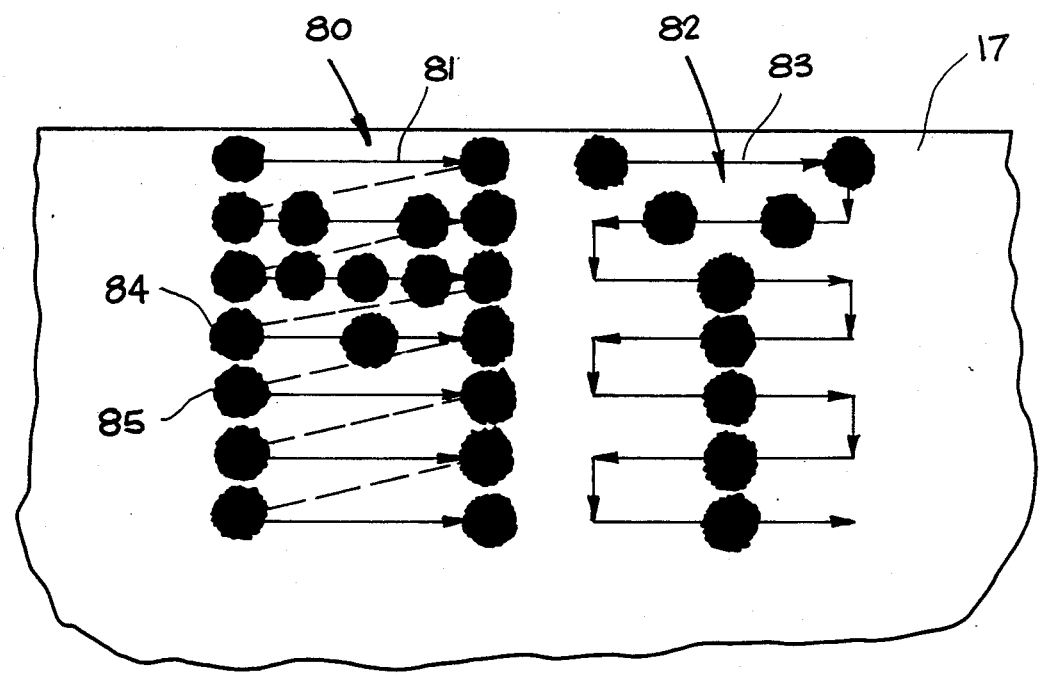
FIG. 2a is a top enlarged view showing rasterscan writing of micrographic characters in accord with the present invention.

In FIG. 2a, microscopic visually readable information is recorded on a portion of strip 17. The information may be personal information, medical records, transactions, office forms, instructions, multiple language information, the date of the most recent update of information on the card or titles for the the digital record on the strip. The information is in the form of characters, such as the alphanumeric characters "M" 80 and "Y" 82, shown in FIG. 2a by way of example. The characters 80 and 82 are made up of matrices of laser recorded character spots. In this embodiment, each character spot is made of a single laser spot. The spots may or may not touch adjacent spots.

The matrices may be five spot sites by seven spot sites, such as in FIG. 2a, seven spot sites by ten spot sites, ten by fourteen or some other combination of spot sites. These spots are written by scanning in a raster-like pattern over the matrix and writing laser spots at designated locations so that characters can be formed. Such characters are formed directly by the spots or by groups of laser spots, termed character spots. Multiples of five by seven are convenient owing to existing software for CRT displays and dot matrix printers which can be adapted for use in laser recording. The actual character set recordable by this method would depend on the software used. The spots in a seven by ten matrix have a diameter of about 20 microns, making the height of a character about 200 microns. The micrographic characters are seen by magnification, such as through a pocket-type optical magnification device. Characters seen through a 20 power or greater device will appear to be about four millimeters high or greater. A magnification of at least ten power will be required to read the characters. The characters are small enough so that they cannot be resolved easily by an average eye with a 5 power magnification or less.

Figure 2B:
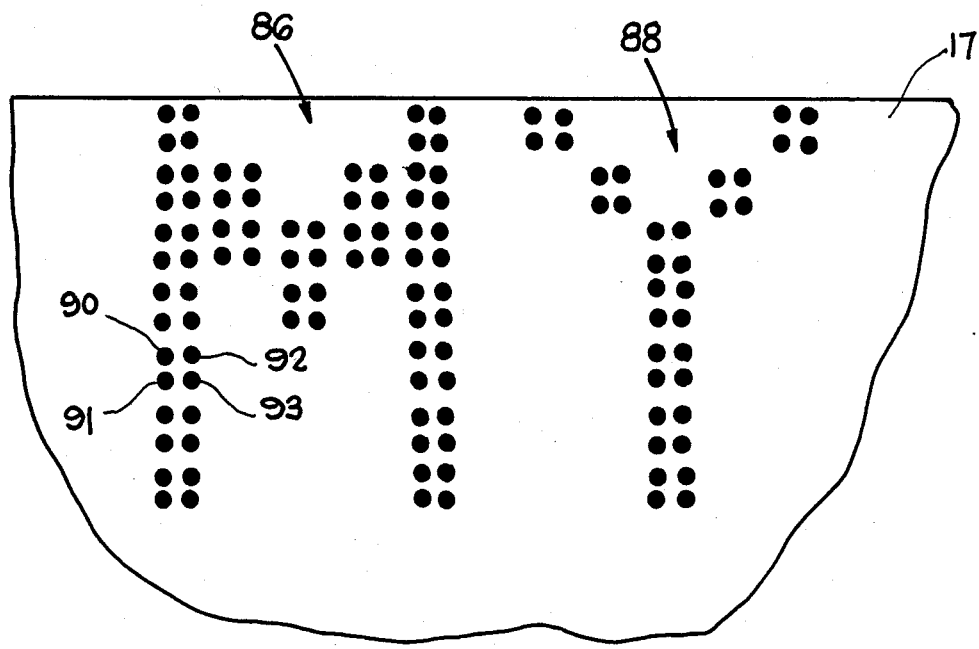
FIG. 2b is a top enlarged view of another style of writing micrographic characters in accord with the present invention.

In FIG. 2b, characters 86 and 88 are recorded on strip 17. FIG. 2b is similar to FIG. 2a except that the character spots are formed from a group of four laser spots. Each laser spot is approximately 10 microns in diameter, making a character spot 20 microns square, as in FIG. 2a. The format is more convenient for some media with high melting points. Alternatively, character spots can be made of 16 five micron laser spots in a square or some other number of spots.

Figure 2C:
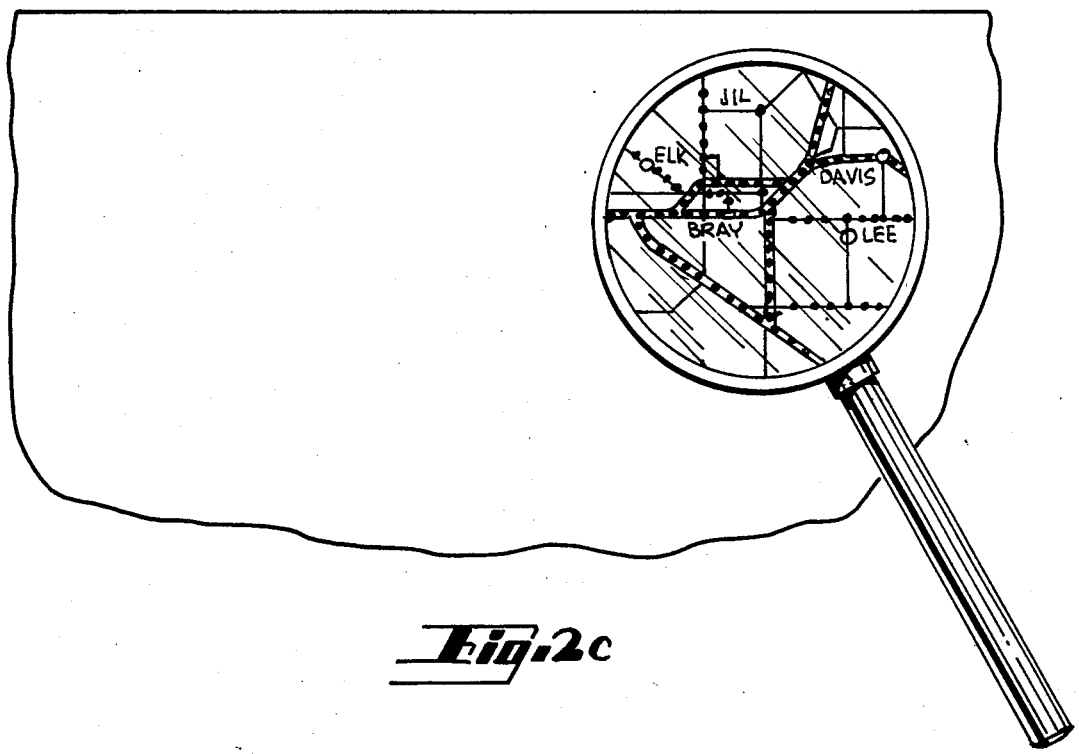
FIG. 2c is a top enlarged view of a micrographic map on a card in accord with the present invention.

In FIG. 2c a map in micrographic form covers the entire side of a card or at least most of the card. Such a map is pre-recorded and then mounted on a card with laser-written annotations superimposed. Alternatively, the map is written entirely in-situ on the card, with annotations. Micrographic characters in the form of clusters of spots define map features, with the characters forming map features, such as roads and cities, using dot patterns. Laser spots may be aligned in a straight line defining a micrographic character which defines a road. Other characters may be established to define cities, airfields, forests, streams and the like. Such a map would be useful to a soldier or traveler.

With reference to FIG. 3, a card substrate 70 carries a secondary substrate 72 which is a thin flexible material, only a few mils thick carrying a laser recording material 74. The secondary substrate 72 is adhered to the primary substrate 70 by means of an adhesive or sticky substance, similar to dry adhesives found on plastic tape. The laser recording material may be any of the materials previously discussed. A protective coating 76 is applied over the laser recording material.

Remarks in the form of microscopically visually readable alphanumerics, foreign language characters, mathematical symbols, and the like, may be laser recorded. Transaction or other information related to a person may be recorded on the card. Such transaction information could be banking information, such as a record of deposits and withdrawals. In former years, such transactions were recorded in a passbook, but because of the amount of time taken for sequential entries in a passbook, and because of automation, passbook banking was abandoned, even though it was more favorable to consumers. Now, sequential transactions may be recorded automatically so that a consumer may once again have a complete record of prior transactions, although a card reader is necessary. Insurance transactions, immigration matters and the like all involve sequential transactions involving personal data. While it is important to record the transaction, it is also important to relate the transaction to eye readable personal data so that a human judgment may be formed. For example, a card user may have a frequently used card for recording transactions which he carries in his wallet, and a second duplicate card for backup in the event the first card is damaged, lost or stolen. The second duplicate card would be updated periodically. It would be important for the user to know when the duplicate card was last updated so a judgement could be made whether further updating is needed. The user would also need to be able to distinguish the two cards. Microscopically visually readable information in the form of the date for the last transaction or update of information on a card would permit such distinguishing and judgement. The date is recorded onto the strip of optical storage medium when a transaction or other update of information on the card is recorded.

Figure 4:
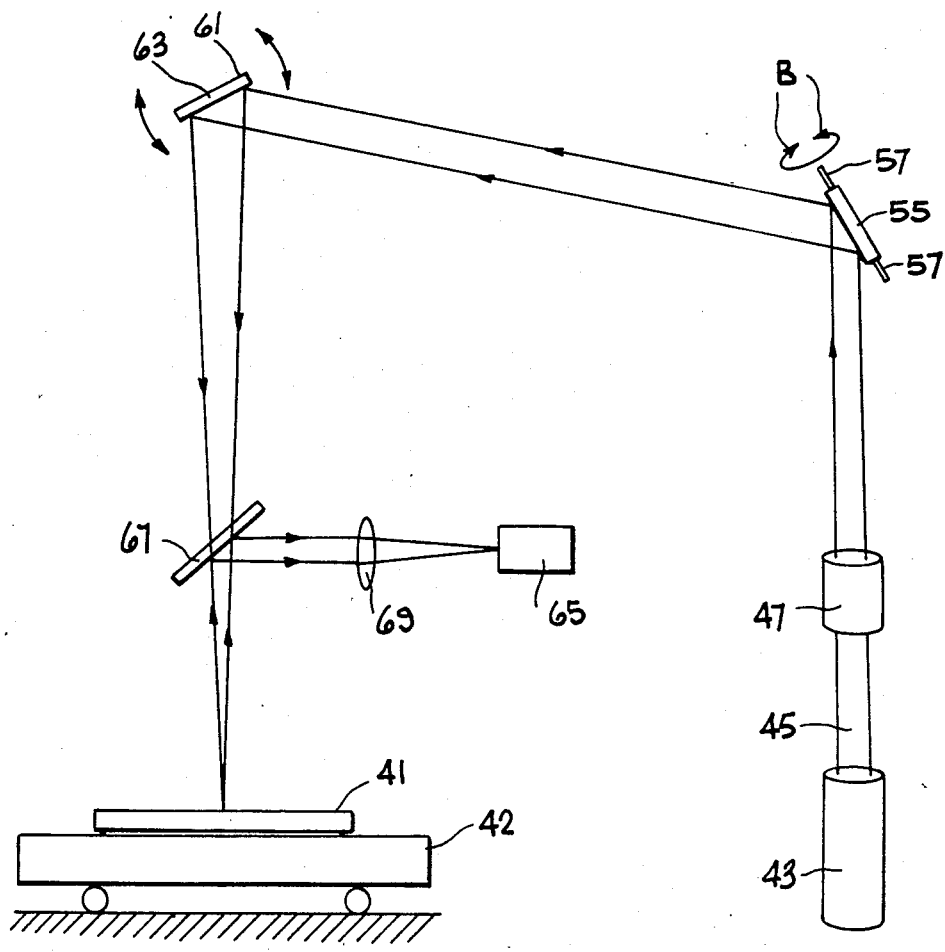
FIG. 4 is a plan view of optical apparatus for reading and writing on the data strip portion of the medium illustrated in FIG. 1.

Of course, while the microscopic visually readable information may be read by conventional optical means, a laser recording apparatus must be used to write the information on the data strip. A laser apparatus is illustrated in FIG. 4, which illustrates the side view of the lengthwise dimension of the medium of FIG. 1 consisting of a data strip capable of storing microscopic visually readable information on a card. The data strip portion 41 of the medium is usually received in a movable holder 42 which brings the strip into the trajectory of a laser beam. A laser light source 43, preferably a pulsed semiconductor laser of infrared wavelength emits a beam 45 which passes through collimating and focusing optics 47. The beam is then directed to a first servo controlled mirror 55 which is mounted for rotation along axis 57 in the direction indicated by arrows B. The purpose of the mirror 55 is to find the lateral edges of the data strip in a coarse mode of operation and then in a fine mode of operation identify character sites which exist predetermined distances from the edges.

From mirror 55, the beam is directed toward a mirror 61. This mirror is mounted for rotation at pivot 63. The purpose of mirror 55 is for fine control of motion of the beam along the length of the data strip. Coarse control of the lengthwise portion of the data strip relative to the beam is achieved by motion of the movable holder 42. The position of the holder may be established by a linear motor adjusted by a closed loop position servo system of the type used in magnetic disk drives. Reference position information may be prerecorded on the card so that position error signals may be generated and used as feedback in motor control. Upon writing one row of characters, the mirror 55 is slightly rotated. The motor moves holder 42 lengthwise so that the next row can be written, and so on.

When writing microscopic visually readable information, mirror 55 is used to identify character sites at predetermined distances from the edges. Mirror 57 moves the scanning beam lengthwise from character site to character site. Upon reading one row of character sites, mirror 55 is slightly rotated. Within a character site, mirrors 55 and 57 cooperate to move the beam in either a zig-zag pattern or a raster-like pattern. Laser spots are written at designated locations within a character site to form a character. When one character is written mirrors 55 and 57 move the beam to the next character site.

As light is scattered and reflected from spots in the laser recording material, the percentage of reflected light from the incident beam changes relative to surrounding material where no spots exist. The incident laser beam should deliver sufficient laser energy to the surface of the recording material to create spots, but should be lowered when reading so as not to cause disruption of the surface during the reading mode. The wavelength of the laser should be compatible with the recording material to achieve this purpose.

Differences in reflectivity between a spot and surrounding material may be detected by light detector 65 which may be a photodiode. Detector 65 confirms laser writing. Light is focused onto detector 65 by beam splitter 67 and focusing lens 69. Servo motors, not shown, control the positions of the mirrors and drive the mirrors in accord with instructions received from control circuits, as well as from feedback devices. The detector 65 produces electrical signals corresponding to spots. Other optics, not shown, would be used to visually observe the microscopically visibly readable information after data is written on the data strip. A jeweler's Loupe with a magnification of 20× would in general be

I claim:

1. An updatable micrographic data card comprising,
a wallet size card having a strip of optical contrast laser recording material disposed thereon,
a plurality of laser written micrographic characters disposed on said strip, each character formed of a matrix of laser recorded character spots, said micrographic characters being eye readable using at least 20 power magnification, but not eye readable using 5 power magnification or less.

2. The card of claim 1 wherein said character spots comprise a group of laser written spots.

3. The card of claim 1 wherein said strip comprises prerecorded micrographic characters and in-situ user written micrographic characters.

4. The card of claim 1 wherein said strip contains micrographic characters defining map features.

5. A method for recording information on a card comprising,
disposing a strip of reflective direct-read-after-write laser recording material in a wallet-size card,
recording micrographic indicia onto said strip, in situ, by means of a laser, a beam from said laser scanning in a pattern a matrix of spot sites corresponding to an indicium on said strip for each of said indicia, said indicia being microscopically visually readable with at least 10 power magnification, but not with 5 power magnification or less.

6. The method of claim 5 wherein said microscopically visually readable information is characters, each made up of a matrix of laser recorded character spots, each of said character spots being made up of at least one laser recorded spot.

7. The method of claim 5 wherein each of said character spots is made up of a group of laser spots.

8. The method of claim 5 further defined by prerecording micrographic indicia on said strip prior to in situ recording.

9. A system for recording information with a laser comprising,
a wallet-size card having a strip of optical contrast reflective direct-read-after-write laser recording material thereon capable of in-situ laser recording of information thereon, said information being microscopically visually readable indicia, the strips adapted for laser recording of data, said indicia being microscopically visually readable with at least 10 power magnification, but not with a 5 power magnification or less,
laser means having a beam disposed in laser writing relation with respect to said strip for writing thereon,
light detector means disposed in reading relation to said strip for reading data, and
means providing relative motion between the beam and the card for writing said indicia on the card, said relative motion being in a pattern for individually recording each of said visually readable indicia.

10. The sytem of claim 9 wherein said microscopically visually readable information comprises characters, each made up of a matrix of individual laser recorded character spots, each of said character spots being made up of at least one laser spot.

11. The system of claim 9 wherein said strip contains micrographic characters defining map features.

12. The system of claim 9 wherein said strip comprises prerecorded micrographic characters and in situ user written micrographic characters.

13. The card of claim 1 wherein said strip contains micrographic characters indicating a date of the most recent update of information on said card.

14. The method of claim 5 wherein some of said indicia being recorded onto said strip indicate a date of said recording.

15. The system of claim 9 wherein some of said indicia are characters indicating a date of the most recent recording of information on said card.

* * * * *